United States Patent [19]

Lönhoff et al.

[11] Patent Number: 5,181,994
[45] Date of Patent: Jan. 26, 1993

[54] PROCESS FOR THE PREPARATION OF CHROMIC ACID

[75] Inventors: Norbert Lönhoff, Leverkusen; Ludwig Schmidt, Krefeld; Hans-Dieter Block; Rainer Weber, both of Leverkusen, all of Fed. Rep. of Germany

[73] Assignee: Bayer Aktiengesellschaft, Leverkusen, Fed. Rep. of Germany

[21] Appl. No.: 625,715

[22] Filed: Dec. 11, 1990

[30] Foreign Application Priority Data

Dec. 16, 1989 [DE] Fed. Rep. of Germany ....... 3941570

[51] Int. Cl.$^5$ ............................................. C25B 1/22
[52] U.S. Cl. .................................. 204/97; 204/59 R; 204/105 R; 204/129
[58] Field of Search ............ 204/59 R, 97, 89, 105 R, 204/129, 101; 423/53, 55, 140, 51, 142, 60, 150, 56

[56] References Cited

U.S. PATENT DOCUMENTS 3,790,456 2/1974 Bruen et al. ........................ 204/97

FOREIGN PATENT DOCUMENTS

| 739447 | 7/1966 | Canada ................................ 204/57 |
| 0371222 | 3/1923 | Fed. Rep. of Germany . |
| 3020260 | 12/1980 | Fed. Rep. of Germany . |
| 2219806 | 3/1974 | France . |
| 2081696 | 2/1982 | United Kingdom . |

OTHER PUBLICATIONS

"Ullmann's Encyclopedia of Industrial Chemistry", vol. A7: Fifth, Completely Revised Edition, pp. 67-81.
J. B. Rosenbaum, Electrowinning Chromium Metal.

*Primary Examiner*—John Niebling
*Assistant Examiner*—Kathryn Gorgos
*Attorney, Agent, or Firm*—Sprung, Horn, Kramer & Woods

[57] ABSTRACT

A process for the production of chromic acid, comprising
a) dissolving ferrochrome in sulphuric acid, optionally with the addition of catholyte and/or anolyte overflow from the electrolysis,
b) removing undissolved constituents by filtration,
c) adding a reducing agent in a quantity more than equivalent to the quantity of iron(III) and chromium-(IV) in the solution,
d) precipitating chromium(III) hydroxide by raising the pH to about 4-6 by the addition of a base while maintaining the reducing conditions in the solution,
e) separating the precipitated chromium hydroxide while maintaining the reducing conditions,
f) working up the aqueous solution containing iron by oxidation; precipitating iron(III) hydroxide or iron-(III) oxide and optionally isolating the sulphate in the solution as sodium sulphate, ammonium sulphate or calcium sulphate,
g) dissolving the separated chromium hydroxide in chromic acid and optionally sulphuric acid where either a single solution in chromic acid is produced or two solutions are produced, one in chromic acid and another in sulphuric acid,
h) separating the solution(s) from undissolved constituents and
i) employing the chromium hydroxide solution in chromic acid as anolyte in the electrolytic production of chromic acid in an electrolytic cell divided by a membrane, and either using the same solution as catholyte in the electrolytic cell divided by a membrane or using the chromium hydroxide solution in sulphuric acid as catholyte in the electrolytic cell divided by a membrane, hydrogen and/or metallic chromium being deposited electrolytically at the cathode and/or chromium(II) ions being produced electrolytically.

6 Claims, 1 Drawing Sheet

PROCESS FOR THE PREPARATION OF CHROMIC ACID

This invention relates to a process for the electrolytic preparation of chromic acid.

BACKGROUND OF THE INVENTION

According to "Ullmann's Encyclopedia of Industrial Chemistry, Fifth Edition, Vol. A 7, VCH Verlagsgesellschaft mbH, Weinheim, 1986, pages 67–81", chromic acid is produced industrially by three different processes. Sodium dichromate is used as starting material for all these processes. In the process of preparation of sodium dichromate, chromium ore is roasted with sodium carbonate and/or sodium hydroxide and atmospheric oxygen. The clinker leaving the furnace used for this roasting is leached with water and/or a solution containing chromium. After adjustment of the pH of the mash to 7-9.5 with sulphuric acid and/or sodium dichromate solution, the sodium monochromate solution obtained is freed from insoluble constituents of chromium ore by filtration. The chromate-containing residue obtained must then be worked up by an expensive process.

For the preparation of sodium dichromate, the chromate ions of the solution are converted into dichromate ions by acidification with sulphuric acid and/or acidification with carbon dioxide under pressure. Chromate-containing sodium sulphate is inevitably formed in the process and must be worked up.

For the preparation of chromic acid by the so-called wet process, the sodium dichromate solution is concentrated and sulphuric acid is added to the solution so that chromic acid crystallizes.

In the so-called melt or dry process, sodium dichromate crystals are reacted with concentrated sulphuric acid in a molar ratio of approximately 1:2 at temperatures of about 200° C. Common to both these processes is the inevitable formation of sodium bisulphate contaminated with chromate either as a melt or as an aqueous solution.

This disadvantage is avoided in the third process, which consists of the electrolysis of sodium dichromate in aqueous solution as described, for example, in DE-C 3 020 260 or CA-A 739 447.

SUMMARY OF THE INVENTION

A process for the preparation of chromic acid which is free from the disadvantages of the above-mentioned processes has now been found.

The present invention relates to a process for the production of chromic acid, characterized by a. dissolving of ferrochrome in sulphuric acid, optionally with the addition of catholyte and/or anolyte overflow from the electrolysis,
b. removal of undissolved constituents by filtration,
c. addition of reducing agents in a quantity which is more than equivalent to the amount of iron(III) and chromium (VI) in the solution obtained,
d. precipitation of chromium(III) hydroxide by raising of the pH to about 4–6 by the addition of a base while the reducing conditions are maintained in the solution,
e. separation of the precipitated chromium hydroxide while the reducing conditions are maintained,
f. working up of the iron-containing aqueous solution by oxidation; precipitation of iron(III) as iron(III) hydroxide or iron(III) oxide compound and optionally isolation of the sulphate contained in the solution as sodium sulphate or ammonium sulphate or calcium sulphate,
g. dissolving of the separated chromium hydroxide in chromic acid and optionally sulphuric acid so that either a single solution in chromic acid is obtained or two solutions are obtained, one in chromic acid and another in sulphuric acid,
h. separation of the solution(s) from undissolved constituents, and
i. use of the solution of chromium hydroxide in chromic acid as anolyte for the electrolytic production of chromic acid in electrolytic cells divided by membranes and either use of the same solution as catholyte in the above mentioned electrolytic cells divided by membranes or use of the solution of chromium hydroxide in sulphuric acid as catholyte in the above mentioned electrolytic cells divided by membranes, hydrogen and/or metallic chromium being deposited electrolytically at the cathode and/or chromium(II) ions being produced electrolytically.

DETAILED DESCRIPTION OF THE INVENTION

Suitable conditions for the cathodic deposition of elementary chromium are described, for example, in "J. B. Rosenbaum, R. R. Lloyd, C. C. Merrill: Electrowinning Chromium Metal, U.S. Bur. of Mines Report of Investigation 5322, U.S. Dep. of the Interior, 1957". This requires a raising of the pH, e.g. by the addition of ammonia. At lower pH values, cathodic reduction to chromium(II) ions takes place preferentially.

A carbon-containing ferrochrome, i.e. high carbon ferrochrome or charge grade ferrochrome, is preferably used as starting materials. Those having a high chromium:iron ratio are particularly suitable.

It is particularly important to provide a reducing medium before precipitation of chromium(III) hydroxide takes place in order that a very pure chromium(III) hydroxide may be obtained. This medium must in particular ensure quantitative reduction of any iron(III) and chromium(VI) present. Particularly suitable reducing agents are: Sulphur dioxide, sulphurous acid and salts thereof, metallic iron and metallic chromium, both of which may be in the form of alloys, chromium(II) salts, hydrazine, hydroxylamine, hydrogen as well as electric current, e.g. on solid bed cathodes of carbon particles. To avoid reoxidation by oxygen, access of air is preferably eliminated, e.g. by using substantially closed apparatus and/or by covering the solutions with inert or reducing gases such as nitrogen, hydrogen, sulphur dioxide or carbon dioxide or the gas or gas mixtures formed when ferrochrome dissolves.

Precipitation of the chromium(III) hydroxide is brought about by raising of the pH to about 4–6 by the addition of bases. Ammonia, alkali metal hydroxides, alkali metal salts of weak or medium strong acids and alkaline earth metal oxides, hydroxides and carbonates are suitable bases for this purpose. Ammonia, sodium hydroxide, sodium carbonate and their aqueous solutions are preferred. Precipitation of chromium(III) hydroxide is preferably carried out at an elevated temperature. The precipitate is separated by filtration or centrifuging which should be carried out with the aim of as far as possible complete removal of the mother liquor adhering to the precipitate. The proportion of impurities in the chromium(III) hydroxide may be further reduced by washing with water or aqueous solutions, e.g. by washing with dilute sodium (bi)sulphite or ammonium bisulphite solution or, for example, by washing in an atmosphere containing sulphur dioxide. The chromium hydroxide may, if desired, be reprecipitated for further purification by dissolving it in acid, e.g. sulphuric acid, and then precipitating it again in a reducing medium by raising the pH. For even greater purity, the iron may be extracted from the acid solution by known processes, e.g. with phosphates or phosphonates.

Chromium hydroxide obtained by this method is also suitable for the preparation of chromium(III) salts such as chromium(III) acetates, nitrate, sulphate and formate, and for the preparation of chrome tanning agents.

The solution left after removal of chromium(III) hydroxide, including the wash solutions, contains virtually all the iron and almost the total amount of sulphate as well as the added base in the form of a sulphate, e.g. ammonium sulphate or sodium sulphate. The iron is precipitated from this solution as iron(III) hydroxide, and may at elevated temperatures also be precipitated as hydrated ferric oxide, by oxidizing the iron(II) in solution and residues of excess reducing agent with atmospheric oxygen, optionally with the aid of known oxidizing catalysts. After removal of the precipitated iron(III) hydroxide, the solution left behind, which contains the sulphate, is either discarded or, preferably, worked up. In particular in the case of a solution containing ammonium sulphate, the ammonia is released and driven off by the addition of quicklime, milk of lime, calcined dolomite or sodium hydroxide solution or sodium carbonate and heating so that it may be used again. Calcium sulphate and/or sodium sulphate are valuable by-products of the process.

The chromium hydroxide which has been separated off is not completely or partly dissolved in chromic acid, for which all or part of the chromic acid solution from the anode compartments of the electrolytic cells is used.

This solution of chromium hydroxide in chromic acid, from which insoluble constituents have been removed, is used to supply the anode compartments of the electrolytic cells for partial or almost complete conversion of the chromium(III) present into chromic acid. If the separated chromium hydroxide has been completely dissolved in chromic acid, the resulting solution is also introduced into the cathode compartments of the electrolytic cells. This may advantageously be preceded by a chemical reduction of the chromium(VI) in the solution by means of sulphur dioxide with simultaneous addition of sulphuric acid for the purpose of improving the current yield in the process of deposition of metallic chromium. It is, however, on the whole more advantageous to dissolve the chromium hydroxide intended for the cathode compartment directly in sulphuric acid so that reduction is then no longer necessary, and the solution, freed from insoluble constituents, may then be introduced into the cathode chambers.

The solution of chromium(III) sulphate in sulphuric acid may be further purified by known methods to reduce the amount of impurities, for example by extraction of the impurities with acid phosphoric acid esters or acid phosphates or acid phosphonates.

An overflow from the cathode chambers is returned to the solution obtained by dissolving ferrochrome in sulphuric acid, optionally after reduction of any components capable of oxidation still present in the overflow, for example by means of sulphur dioxide, and, if desired, part of the overflow may also be used for charging the cathode chambers by returning it into the solution of chromium(III) salt in chromic or sulphuric acid obtained by dissolving the chromium hydroxide in acid.

If electrolysis is carried out under such conditions that the catholyte solution contains chromium(II) ions, part of the overflowing catholyte may be used as reducing agent in the precipitation of chromium(III) hydroxide. The remaining part is returned to the solution obtained by dissolving ferrochrome after oxidation of the chromium(II) ions, for example by means of atmospheric oxygen. The catholyte containing chromium(II) ions may also be used for the reduction of organic compounds as described, for example, in "J. R. Hanson and E. Premuzic, Zeitschrift für Angewandte Chemie, Year 80, 1968, No. 7, pages 271 to 276".

The chromic acid solution produced in the anode chambers is removed and partly or completely utilized as chromic acid, either in the form of the solution removed from the anode chambers or in the form of solid chromic acid. For producing solid chromic acid, the solution is generally concentrated by evaporation and the chromic acid is left to crystallize, preferably at an elevated temperature. The mother liquor remaining behind after crystallization of the chromic acid and still containing dissolved chromic acid may be used again for dissolving chromium hydroxide. The amount of chromic acid which can be removed from the process is, of course, no greater than the amount produced electrolytically and further, an almost constant proportion of chromic acid must always be available for dissolving the chromium hydroxide. If the solution intended for the cathode chambers is also produced by dissolving chromium hydroxide in chromic acid, the total amount of chromic acid which can be removed from the process is decreased by the amount destroyed by reduction.

In order to reduce the accumulation of impurities in the anode chambers, part of the chromic acid solution produced or part of the mother liquor remaining behind after crystallization of the chromic acid may be discharged or subjected to a purification. Purification may be carried out, for example, by reducing the chromium(VI), e.g. with sulphur dioxide, optionally with the addition of sulphuric acid, and returning the resulting solution to the apparatus where the ferrochrome is dissolved or to the solution obtained after the ferrochrome has been dissolved.

In one particularly preferred variation of the process, part of the anolyte solution leaving the anode chambers and containing chromic acid and optionally sulphuric acid is used for dissolving chromium hydroxide, another part is worked up to form chromic acid solution and/or chromic acid crystals and a third part is discharged and used for dissolving ferrochrome after reduction with sulphur dioxide.

If a very high degree of purity is required, the proportion of anolyte solution discharged is chosen high enough to keep the proportion of foreign ions in the electrolysis circulation low. This proportion of anolyte solution to be discharged may be up to 10% of the total quantity of anolyte solution produced, whereby the quantity of chromic acid which can be isolated is reduced correspondingly.

Diaphragms, anion exchanger membranes and cation exchanger membranes may be used for separating the anode and cathode chambers of the cells. Cation exchanger membranes having a perfluorocarbon structure with sulphonate exchange groups are preferably used. Such membranes are available commercially, for example from Du Pont, U.S.A. under the name of ®Nafion. Examples of suitable membranes include ®Nafion 117, 324, 417, 423 and 430.

The electrolytic cells used are preferably frame cells of the filter press type. If metallic chromium is produced at the cathode side, these cells are preferably constructed in that way that the cathode plates can easily be removed from the cell after deposition of the metallic chromium. The material used for the construction of the electrolytic cells should be resistance to chromic acid solution and may in particular be titanium, after-chlorinated PVC (CPVC) or PVDF.

The cathode plates may be made of various materials, such as graphite, lead, copper, nickel, brass and alloys thereof. Cathode plates of stainless steel are preferred.

The electrodes on the anode side preferably have an electrocatalytically active layer with a high oxygen over-voltage. These may, for example, be electrodes of lead, lead alloys or hardened lead dioxide. Anodes of this type are described, for example, in DE-A 2 619 426.

Electrodes of a valve metal such as titanium, niobium or tantalum or of graphite coated with lead dioxide are particularly preferred. Anodes of this type are described, for example, in DE-A 2 714 605 and U.S. Pat. No. 4,236,978. These anodes may have a conductive interlayer between the valve metal and the layer of lead dioxide. This interlayer may consist of one or more metal oxides such as oxides of platinum metals or oxides of titanium, tantalum, vanadium and other non-noble metals or noble metals which have been deposited by wet electroplating or electroplating from molten salts, such as platinum and iridium.

The anodes may be constructed, for example, as plate electrodes, stretch metal anodes, so-called knife anodes, so-called spaghetti anodes or louvre type anodes.

Solid bed anodes are used in one advantageous variation of the process. These solid bed anodes may be composed, for example, of beds of lead balls, titanium balls, titanium sponge particles or graphite particles or of a porous titanium sintered metal on which lead dioxide has been deposited on the surface. The balls or particles have a diameter of from 1 to 10 mm, preferably from 2 to 5 mm. This measure ensures almost complete oxidation of chromium(III) to chromic acid in the anode chamber of the cells with high anodic current yield and high volume/time yield.

The electrolytic cells are operated at temperatures from 25° to 85° C., preferably from 50° to 80° C.

The electrolytic cells have anolyte and catholyte circulations in which the electrolytes are rapidly pumped round.

Fresh electrolyte prepared by dissolving chromium hydroxide in a solution containing sulphuric acid and-/or chromic acid is continuously introduced into these circulations. Overflowing anolyte containing chromic acid is returned to the process as described above or worked up to chromic acid solution and/or chromic acid crystals. The catholyte overflow is returned to the process, preferably before precipitation of the chromium hydroxide.

If metallic chromium is to be produced cathodically, a total chromium concentration of from 20 to 60 g/l and a pH of from 1 to 2.8, preferably from 2.1 to 2.8, is maintained in the catholyte circulation for obtaining high rates of deposition of metallic chromium and high current yields. This may be achieved, for example, by adjusting the quantity of fresh electrolyte introduced into the catholyte circulation and the quantity of acid contained therein or by independent addition of bases or acids or by varying the cathodic current density within the given limits. The total chromium concentration in the anolyte circulation may be from 20 to 700 g/l.

Electrolysis is carried out at cathodic current densities of from 0.3 to 3 $kA/m^2$, preferably at 0.3 to 1.7 $kA/m^2$. When solid bed anodes are used, the anodic current densities are from 1 to 15 $A/m^2$, preferably from 4 to 8 $A/m^2$ of the anode surface.

The process according to the invention enables chromic acid to be produced without the inevitable formation of by-products containing chromium(VI).

BRIEF DESCRIPTION OF THE DRAWINGS

The process according to the invention will now be described in more detail with reference to FIG. 1 which is a schematic flow sheet. The process variation illustrated in FIG. 1 is a particularly advantageous embodiment.

DETAILED DESCRIPTION OF THE DRAWINGS

Figure 1:
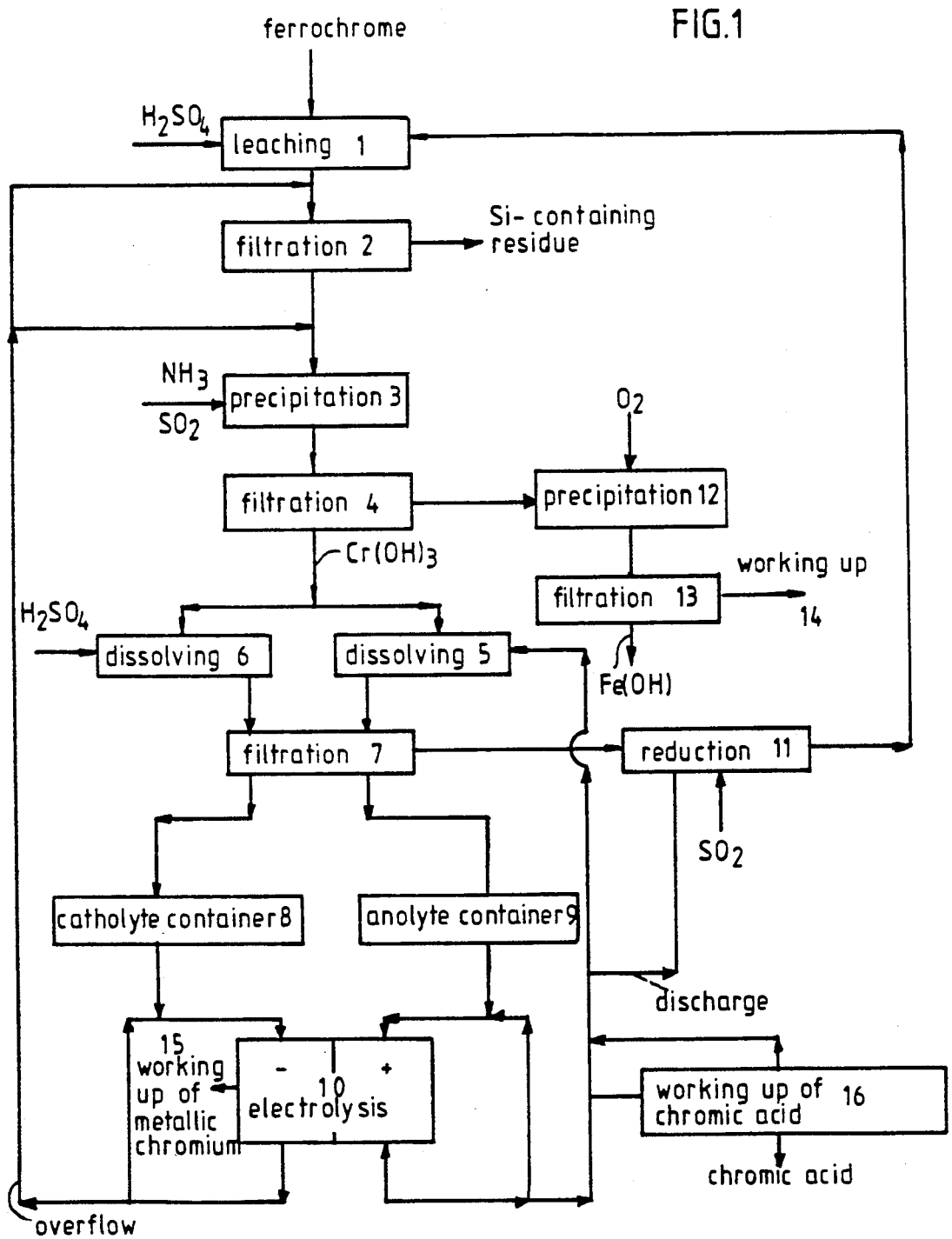

Ground high carbon ferrochrome is dissolved at boiling temperature (1) with concentrated sulphuric acid and optionally with discharged and reduced anolyte overflow (11) and catholyte overflow. The solution obtained is cooled to about 80° C. and freed from undissolved, silicon-containing residue by filtration (2). This residue is freed from soluble constituents by washing with water and eliminated under controlled conditions. The wash water is returned to the leaching process (1) or combined with the solution.

Chromium hydroxide is precipitated from the resulting clear solution (3) by the addition of sodium hydroxide or, preferably, ammoniacal gas or solution under reducing conditions, optionally after dilution of the solution with water, and is separated off (4) and washed. Sulphur dioxide is added to the solution before and during precipitation (3) in order to maintain the reducing conditions and filtration (4) is carried out with exclusion of oxygen. This is achieved by employing substantially sealed apparatus and by covering the solutions with nitrogen. Precipitation is carried out at temperatures from 50° to 90° C. and at pH values from 4 to 6. In order to precipitate iron(III) hydroxide, atmospheric oxygen is added at 60° to 90° C. to the filtrate containing iron(II) sulphate obtained from the process of precipitation (3) so that iron(III) is precipitated as hydrated ferric oxide. After removal of this precipitate (13), the solution is worked up to form sodium sulphate in a known manner by the addition of sodium hydroxide. The ammonia gas released on heating is used for the precipitation (3).

To prepare the solution for the supply of anolyte (9), the separated aqueous chromium hydroxide is then dissolved (5) in anolyte solution containing chromic acid and/or in mother liquor from the working up of chromic acid (16) and is optionally freed from undissolved constituents by filtration (7). The residue of filtration (7) is returned to the leaching stage (1) by way of reduction (11).

To prepare the solution for the catholyte supply (8), separated, aqueous chromium hydroxide is dissolved in sulphuric acid (6) and optionally freed from undissolved components by filtration (7).

After adjustment to the optimum concentrations for the electrolytic process by the addition or evaporation of water and adjustment of the pH values by the addition of chromium hydroxide and/or sulphuric acid and-/or anolyte solution containing chromic acid, the electrolytes are introduced into the anolyte and catholyte circulations of the cells via the anolyte container (9) and via the catholyte container (8), the latter optionally after reduction with sulphur dioxide with the addition of sulphuric acid.

Electrolysis (1) is then operated under such conditions that a total chromium concentration of from 10 to 100 g/l and pH values below 1 are established in the catholyte circulation. This is achieved by controlling the rate of supply of electrolyte from the container (8) and by adjusting the cathodic current density in the range of from 0.05 to 0.8 kA/m$^2$ or by the addition of sulphuric acid. The electrolysis temperature of from 50° to 80° C., most preferably about 60° C., is controlled by heat exchangers in the anolyte and catholyte circulation. The overflow from the catholyte circulation is returned to the process by introduction into the leaching stage (1) and at a point upstream of the precipitation (3). Any metallic chromium separated is introduced into the leaching (1) or the precipitation (3).

When chromic acid and metallic chromium are produced simultaneously, electrolysis is carried out in such a manner that pH values from 2.1 to 2.8 and total chromium concentrations of from 20 to 60 g/l are established in the catholyte circulation. These pH values are adjusted by the addition of ammonia or another base. The cathodic current density is adjusted to values from 0.3 to 1.7 kA/m$^2$ and the temperature of electrolysis to a value from 50° to 80° C., preferably 60° C. For achieving high cathodic current yields, the catholyte circulation is operated with exclusion of atmospheric oxygen, for example by covering with nitrogen.

After electrolysis for about 50 to 100 hours, the cathode plates covered with deposited metallic chromium are removed from the cells and freed from metallic chromium. The metallic chromium obtained is then worked up by known methods to produce a marketable product (15).

The overflow of anolyte circulation containing chromic acid is used for dissolving chromium hydroxide (5) and for preparing chromic acid solution and chromic acid crystals (16). To avoid accumulation of impurities in the anolyte circulation, part of the anolyte solution is returned to the leaching process (1) after reduction with sulphur dioxide (11).

For the preparation of chromic acid solution, the anolyte solution is adjusted to a CrO$_3$ concentration of about 50% by evaporation or addition of water, optionally after oxidation of chromium(III) residues by means of peroxide sulphates.

Marketable chromic acid crystals are obtained from this solution by the evaporation of water in a vacuum, centrifuging and washing with water and drying. The mother liquor obtained from centrifuging and the wash solution are used for leaching (1) after reduction (11) and/or for dissolving chromium hydroxide (5) without previous reduction with sulphur dioxide.

It will be understood that the specification and examples are illustrative but not limitation of the present invention and that other embodiments within the spirit and scope of the invention will suggest themselves to those skilled in the art.

EXAMPLE

An amount of 1090 g of ground high carbon ferrochrome are dissolved in 2580 g of 96% strength sulphuric acid and 5 l of water at 100° C. The resulting solution is cooled to 80° C. and freed from undissolved residue by filtration. An amount of 14.2 l of catholyte overflow produced during electrolysis are added to the resulting clear solution. This gives 21 l of a solution containing 57 g/l of chromium(III) and 15 g/l of iron(II). Chromium hydroxide is precipitated from this solution by adding 9.9 l of a 30% strength ammoniacal solution in water at 90° C. and a pH value of 6 and continuously adding SO$_2$, and the precipitate is filtered off via a porcelain filter. Atmospheric oxygen is added to the resulting 24 l of iron-containing filtrate (15 g/l Fe$^{2+}$), whereupon iron(III) is precipitated as hydrated ferric oxide. The chromium hydroxide separated off is washed with 7 l of water at 80° C., reductive conditions and a pH value of 6 being adjusted by adding SO$_2$ and an aqueous ammoniacal solution. After the washing step, 10.8 kg of aqueous chromium hydroxide with a content of 66% by weight of H$_2$O remain. To prepare the solution for the catholyte supply, 7.15 kg of aqueous chromium hydroxide are then dissolved in 2.85 kg of 96% strength sulphuric acid and freed from undissolved constituents by fine filtration. To prepare the solution for the anolyte supply, 3.65 kg of aqueous chromium hydroxide are dissolved in 10 l of a chromic acid solution containing 670 g/l of CrO$_3$ and freed from undissolved constituents by fine filtration. These solutions are introduced into a twin chamber electrolytic cell. The electrolytic cell consists of electrode compartments made of Plexiglas ® (methyl acrylate plastic manufactured by the Röhm company). The membrane employed is a cation exchange membrane with sulphonic acid exchange groups, manufactured by the Du Pont company under the name Nafion ® 324. The cathode consists of a stainless steel plate and has an area of 250 cm$^2$. The anode consists of two lead dioxide plates with a total area of 450 cm$^2$.

The electrolysis is carried out at 10 A and 60° C. Under these conditions a cell voltage of 6 V results. During the electrolysis, the pH value of the catholyte is kept at 2.5 by adding chromium hydroxide. After a period of electrolysis of 8 hours, 18.2 g of metallic chromium are deposited on the cathode. Over the same period, 12.2 g of CrO$_3$ are formed on the anode by oxidation of chromium(III).

Pure chromic acid is then recovered from the anolyte solution obtained during electrolysis by evaporation of the water content in vacuo and filtration.

We claim:

1. A process for the production of chromic acid, comprising
    a) dissolving ferrochrome in sulphuric acid, to create an aqueous solution,
    b) removing undissolved constituents from said solution by filtration after cooling to about 80° C.,
    c) adding to said solution a reducing agent in a quantity more than equivalent to the quantity of iron (III) and chromium (IV) present in the solution,
    d) precipitating chromium (III) hydroxide from said solution by raising the pH to from about 4 to about 6 by the addition of a base while maintaining the reducing conditions in the solution wherein the base is at least one of ammonia, sodium hydroxide, sodium carbonate and an aqueous solution thereof, e) separating the precipitated chromium hydroxide from the solution at a temperature between 50° and 90° C. while maintaining the reducing conditions, f) working up the aqueous solution by oxidation; precipitation iron (III) as either iron hydroxide, iron (III) oxide or both, g) forming a first aqueous solution of a portion of the separated chromium hydroxide with chromic acid, and a second aqueous solution of the remainder of the separated chromium hydroxide with an acid selected from the group consisting of chromic acid and sulfuric acid, h) separating the solution from undissolved constituents and i) employing said first solution as anolyte in the electrolytic production of chromic acid in an electrolytic cell divided by a membrane, and using the second solution as catholyte in the above mentioned electrolytic cell; at least one of (i) at least one of hydrogen and metallic chromium being deposited lectrolytically at the cathode, and (ii) chromium (II) ions being produced electrolytically.

2. The process of claim 1 wherein a portion of the catholyte, the anolyte or both is withdrawn from the electrolyte cell and added to the sulfuric acid used to dissolve the ferrochrome in step (a).

3. The process of claim 1 wherein a sulfate is removed from the worked-up solution of step (f).

4. A process according to claim 1, wherein in step (c) the reducing agent is at least one of sulphur dioxide, sulphurous acid or a salt thereof, metallic iron, metallic chromium, a chromium (II) salt, hydrazine, hydroxylamine and hydrogen.

5. A process according to claim 1, wherein a part of the anolyte solution is withdrawn from the cell in step (i) and used for dissolving chromium hydroxide in step (g), and another part is withdrawn and worked up into at least one of chromic acid solution and chromic acid crystals and a third part is withdrawn and used for dissolving ferrochrome in step (a) after reduction with sulphur dioxide.

6. A process according to claim 1, wherein in step (i) a perfluorinated cation exchanger membrane containing sulphonate exchanger groups is used for the separation of anode and cathode chambers of the cell.

* * * * *